US007443114B2

(12) United States Patent
Kato

(10) Patent No.: US 7,443,114 B2
(45) Date of Patent: Oct. 28, 2008

(54) IMAGE FORMING APPARATUS

(75) Inventor: Koji Kato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 199 days.

(21) Appl. No.: 11/302,200

(22) Filed: Dec. 14, 2005

(65) Prior Publication Data

US 2006/0125430 A1 Jun. 15, 2006

(30) Foreign Application Priority Data

Dec. 15, 2004 (JP) ............................ 2004-362551

(51) Int. Cl.
*H02P 5/46* (2006.01)

(52) U.S. Cl. ........................................................ 318/69

(58) Field of Classification Search .................... 318/69
See application file for complete search history.

(56) References Cited

U.S. PATENT DOCUMENTS 5,121,327 A * 6/1992 Salazar ........................ 705/408
6,278,857 B1 * 8/2001 Monji et al. ................ 399/301

FOREIGN PATENT DOCUMENTS

JP 2000-238374 9/2000

* cited by examiner

*Primary Examiner*—Erick Glass
(74) *Attorney, Agent, or Firm*—Rabin & Berdo, P.C.

(57) ABSTRACT

A position detecting unit detects rotational position information of a plurality of motors. A phase difference control unit delays an excitation phase switching pulse of at least one of the motors by a predetermined amount on the basis of the rotational position information of the motors and predetermined time difference information.

10 Claims, 9 Drawing Sheets

IMAGE FORMING APPARATUS

BACKGROUND OF THE INVENTION

1. Field of the Invention

The invention relates to an image forming apparatus such as copying apparatus, electrophotographic printer, or the like and, more particularly, to the improvement of a driving system of a photosensitive drum equipped for such an apparatus.

2. Related Background Art

Hitherto, a color image forming apparatus such as copying apparatus, electrophotographic printer, or the like for performing color printing of yellow (Y), magenta (M), cyan (C), and black (K) has been known. The following system is used as a representative system for such a color image forming apparatus.

(1) A tandem system in which four independent light sources and image drum units (hereinafter, referred to as "ID units") serving as image forming processes are arranged in the conveying direction of a print sheet, the conveying direction is set to a predetermined direction, the sheet is allowed to pass, and images of four colors are sequentially printed by the ID units (refer to JP-A-2000-238374).

(2) An intermediate transfer member system in which after toner images of four colors are temporarily formed onto a drum- or belt-shaped intermediate transfer member, they are transferred onto the sheet.

(3) A batch multiple developing system in which, after the toner images of four colors are directly sequentially developed on a photosensitive drum, they are transferred onto the sheet in a lump.

(4) A transfer drum system in which the sheet is wound around a transfer drum and the toner images of four colors of yellow (Y), magenta (M), cyan (C), and black (K) are sequentially directly multiple transferred onto the sheet.

Among them, according to the tandem system, since the color printing can be performed by one processing step, the tandem system has such an advantage that it is suitable for realization of a high speed upon full color printing as compared with other systems. In the tandem system, a DC brushless motor which can rotate at a high speed is used as a driving source for rotating the photosensitive drum. In the DC brushless motor, when a phase current is switched, a spike-shaped current noise occurs. In the tandem system, four ID units are ordinarily arranged. Therefore, there is also a case where the spike-shaped current noises occurring in a plurality of DC brushless motors are multiplexed at same timing and become a large power noise. It is also presumed that such a large power noise causes an unexpected problem in which it induces the erroneous operation of a CPU in the apparatus, it becomes an electromagnetic noise and is dispersed to peripheral equipment, or the like.

It is a problem to be solved that, as mentioned above, if the DC brushless motors are used in the image forming apparatus, when the phase current is switched, the spike-shaped current noises occur, and the case where the spike-shaped current noises are multiplexed at the same timing and become the large power noise can occur.

SUMMARY OF THE INVENTION

It is, therefore, an object of the invention to provide an improved driving system of a photosensitive drum equipped for an image forming apparatus such as copying apparatus, electrophotographic printer, or the like.

According to the present invention, there is provided an image forming apparatus having a plurality of motors which are rotated in response to phase switching signals, comprising:

a position detecting unit which detects a rotational position of each of the plurality of motors;

a time lag information calculating unit which calculates time lag information for changing a phase switching time between the motors; and a phase difference control unit which delays the phase switching signal of at least one of the plurality of motors from the rotational position information of each of the motors and the time lag information on the basis of the time lag information and outputs the delayed signal.

Moreover, in the image forming apparatus, the phase difference control unit generates a signal to discriminate whether or not each of the plurality of motors is rotating at a predetermined speed, and the apparatus further comprises a switching circuit which delays the phase switching signal and outputs the delayed signal if it is determined that each of the motors is rotating at the predetermined speed and which outputs the phase switching signal without delaying the signal if it is determined that each of the motors is not rotating at the predetermined speed.

Moreover, in the image forming apparatus, the apparatus has a first motor and a second motor as the plurality of motors, and the phase difference control unit has a time difference information output unit which receives a first phase switching signal obtained from position detection information of the first motor and a second phase switching signal obtained from position detection information of the second motor and outputs a time difference information signal by using the first phase switching signal and the second phase switching signal; and a time lag information output unit which outputs the time lag information from the time difference information signal and a preliminarily-stored phase difference to be provided between the motors.

Moreover, in the case, the apparatus has a third motor and a fourth motor as the plurality of motors, and the preliminarily-stored phase difference to be provided between the motors is equal to one of 15°, 30°, and 45°.

Moreover, in the image forming apparatus, the apparatus has a first motor and a second motor as the plurality of motors, and the phase difference control unit has a time difference information output unit which receives a first phase switching signal obtained from position detection information of the first motor and a second phase switching signal obtained from position detection information of the second motor and outputs a time difference information signal by using the first phase switching signal and the second phase switching signal; a first time lag information output unit which outputs first time lag information from the time difference information signal and a preliminarily-stored phase difference to be provided between the motors; and a time lag dividing unit which divides the first time lag information and outputs a time lag signal.

Moreover, in the case, the apparatus has a third motor and a fourth motor as the plurality of motors, and the preliminarily-stored phase difference to be provided between the motors is equal to one of 15°, 30°, and 45°.

Furthermore, in the case, the time lag dividing unit outputs the time lag signal from a preset maximum delay phase difference and the first time lag information.

Moreover, the image forming apparatus may further comprise a medium conveying path which conveys a medium.

Then, a rotor is coupled with each of the plurality of motors and the plurality of rotors are arranged along the medium conveying path.

Moreover, the image forming apparatus may further comprise print mechanisms which print a plurality of different colors. Then, the rotors are mounted in the different print mechanisms.

Moreover, in the image forming apparatus, the plurality of motors may be DC brushless motors.

By adjusting the phase difference of the drive currents which are supplied to a plurality of motors and dispersing the ripple (spike-shaped current noise) occurring in each drive current, the generation of the large power noise can be prevented. The occurrence of the unexpected problem in which it induces the erroneous operation of the CPU in the apparatus, it becomes the electromagnetic noise and is dispersed to the peripheral equipment, or the like can be prevented.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The invention is applied to an image forming apparatus of the tandem system and ripples (spike-shaped current noises) which are generated from DC brushless motors used in four ID units are dispersed at intervals of a phase difference of 15°.

Embodiment 1

The case where the invention is applied to a color electrophotographic printer will now be described. In the following description, first, a whole construction of the color electrophotographic printer and a construction of a control circuit will be explained and, thereafter, switching control of phase excitation currents of the DC brushless motors according to the invention will be explained.

Figure 1:
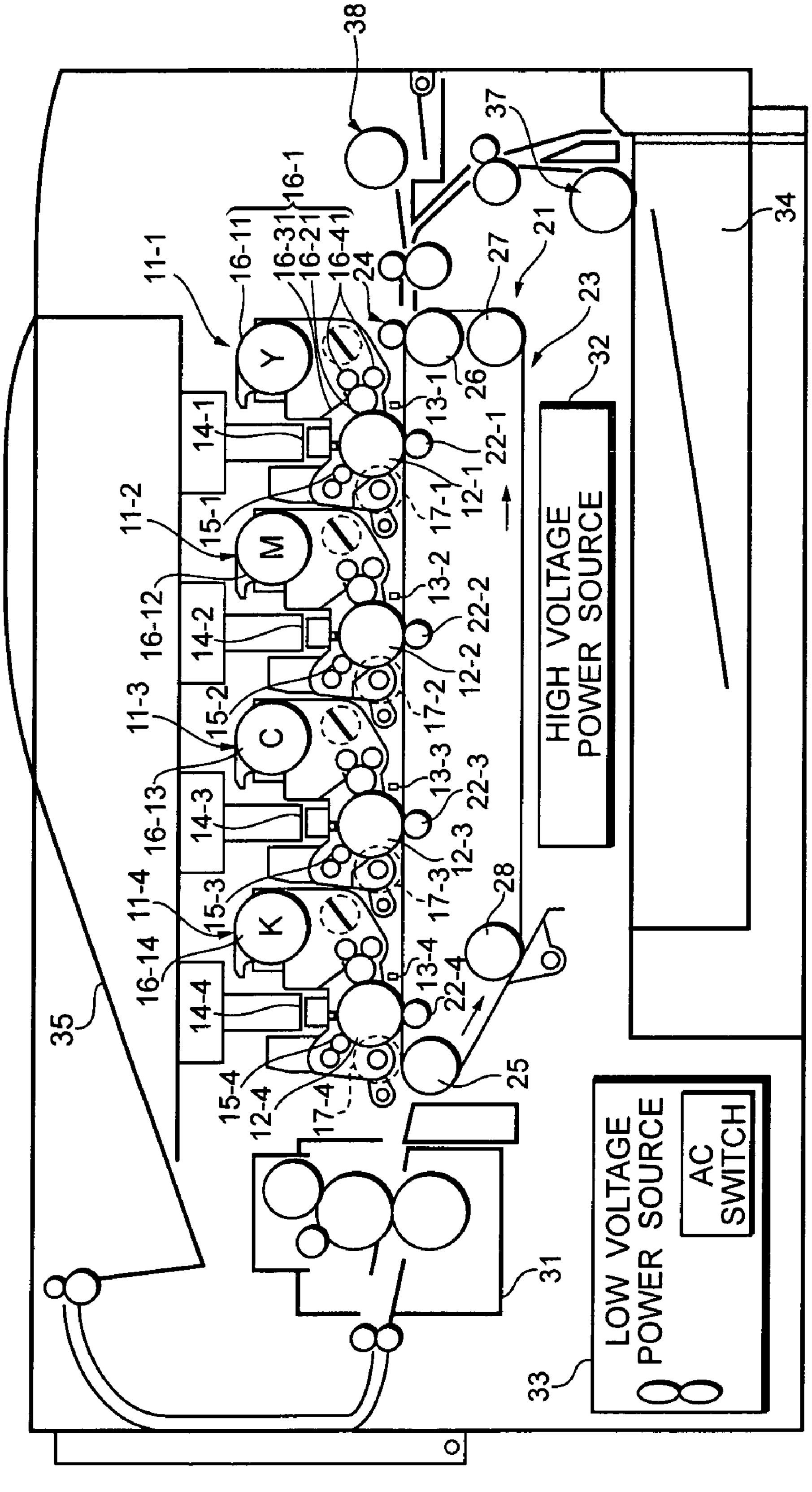
FIG. 1 is a cross sectional view showing a construction of a color electrophotographic printer.

FIG. 1 is a cross sectional view showing a construction of the color electrophotographic printer.

In the diagram, ID units 11-1 to 11-4 have electronic LED print mechanisms for printing in four colors of Y (yellow), M (magenta), C (cyan), and K (black) and are sequentially arranged from the inserting side to the ejecting side of a print sheet.

The ID units 11-1 to 11-4 are provided with: photosensitive drums 12-1 to 12-4; charge removal lamps 13-1 to 13-4; LED heads 14-1 to 14-4; charging rollers 15-1 to 15-4; developing units 16-1 to 16-4; and cleaning units 17-1 to 17-4, respectively.

The photosensitive drums 12-1 to 12-4 are drums of developing devices each for forming an electrostatic latent image onto the surface of each drum and allowing toner to be adsorbed by the electrostatic latent image.

The charge removal lamps 13-1 to 13-4 are used to remove charges from the photosensitive drums 12-1 to 12-4, respectively.

The LED heads 14-1 to 14-4 are used to expose the charged surfaces of the photosensitive drums, respectively.

The charging rollers 15-1 to 15-4 are used to charge the photosensitive drums 12-1 to 12-4, respectively.

The developing units 16-1 to 16-4 are used to adhere the toner onto the exposure portions exposed on the photosensitive drums 12-1 to 12-4, respectively. The developing unit 16-1 comprises: a toner tank 16-11; a developing roller 16-21 for supplying the toner to the photosensitive drum 12-1; a developing blade 16-31 which is come into contact with the developing roller 16-21 and used to form a thin toner layer onto the developing roller 16-21; and supplying rollers 16-41 which are in contact with the developing roller 16-21 in order to charge the toner supplied from the toner tank 16-11. The other developing units 16-2 to 16-4 are also constructed in a manner similar to the developing unit 16-1.

The cleaning units 17-1 to 17-4 are used to collect the toner remaining on the photosensitive drums 12-1 to 12-4 without being transferred, respectively.

A conveying belt unit 21 comprises: transfer rollers 22-1 to 22-4; a conveying belt 23; an adsorption roller 24; a conveying belt driving roller 25; and rollers 26 to 28. The conveying belt unit 21 is used to convey the print sheet to each of the ID units 11-1 to 11-4 in a predetermined conveying direction.

The conveying belt 23 is an endless belt for conveying the print sheet and is made of a semiconductive material so that an image of each color is transferred without causing a color drift. The conveying belt 23 electrostatically adsorbs the print sheet and conveys it.

In order to transfer the toner image of each color onto the print sheet, the transfer rollers 22-1 to 22-4 are arranged so that their axes are in parallel with axes of the photosensitive drums 12-1 to 12-4, and urge the sheet put on the conveying belt 23 onto the photosensitive drums 12-1 to 12-4, respectively.

The conveying belt driving roller 25 is used to drive the conveying belt 23 in the direction shown by an arrow in the diagram.

The adsorption roller 24 is used to adsorb the sheet onto the conveying belt 23.

The rollers 26 to 28 are used to fold back the conveying belt 23.

A fixing device 31 is fixing means for heating the print sheet and melt-bonding the toner onto the sheet, thereby fixing it.

A high voltage power source 32 is a process controlling power source to supply high voltages to the ID units 11-1 to 11-4 and the conveying belt unit 21 and is arranged under the conveying belt unit 21.

A low voltage power source 33 is a power source to supply a low voltage to the fixing device 31 and is arranged under the fixing device 31.

A tray 34 to enclose the print sheets before the printing is arranged under the high voltage power source 32. A stacker 35 to enclose the fixing-processed print sheets is arranged over the fixing device 31.

A hopping roller 37 to introduce the print sheet into the printer main body is arranged near a pickup port over the tray 34. A front roller 38 to introduce the manually-inserted print sheet into the printer main body is arranged over the hopping roller 37.

The conveying belt unit 21, hopping roller 37, and front roller 38 correspond to conveying means.

Figure 2:
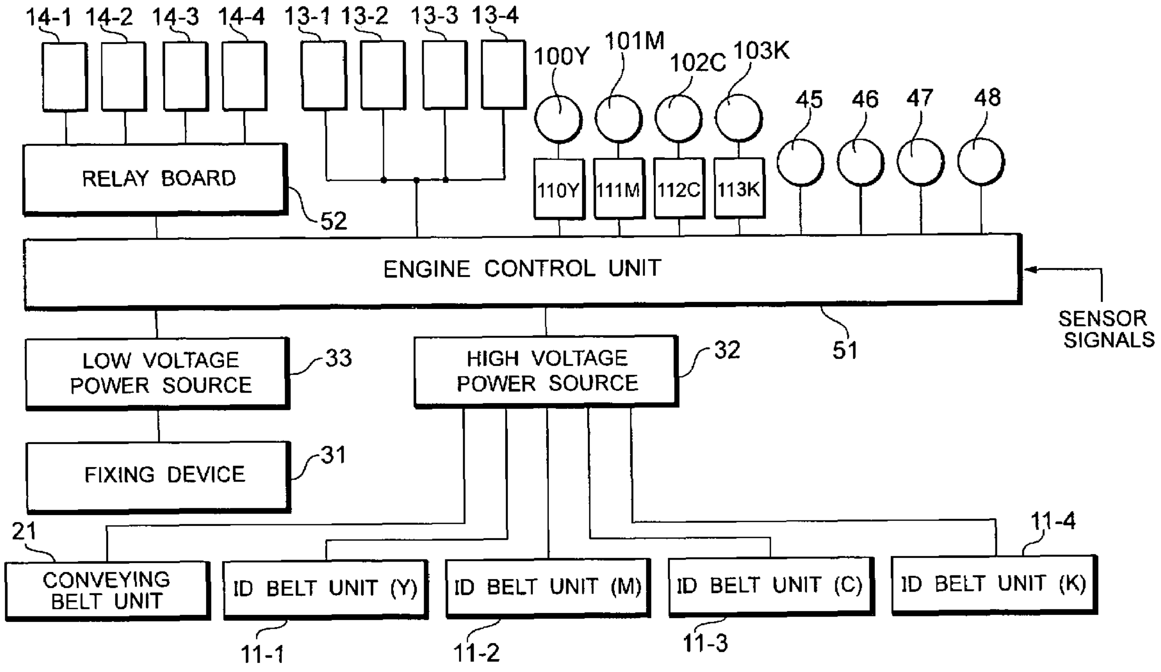
FIG. 2 is a block constructional diagram of a control circuit of a printer main body.

FIG. 2 is a block constructional diagram of a control circuit of the printer main body.

An engine control unit 51 receives sensor signals from the respective units and controls the main body of the color electrophotographic printer.

The LED heads 14-1 to 14-4 are connected to the engine control unit 51 through a relay board 52 having interfaces or the like.

The charge removal lamps 13-1 to 13-4 are directly connected to the engine control unit 51 and are connected to the high voltage power source 32 and the low voltage power source 33 through the engine control unit 51.

DC brushless motors 100Y, 101M, 102C, and 103K are used to drive the ID units 11-1 to 11-4, respectively.

A belt motor 45 drives the conveying belt driving roller 25 (FIG. 1). A heater motor 46 drives the fixing device 31 (FIG. 1).

A hopping motor 47 drives the hopping roller 37 (FIG. 1). A front motor 48 drives the front roller 38 (FIG. 1).

For example, pulse motors, DC motors, or the like are used as motors 45 to 48.

Figure 3:
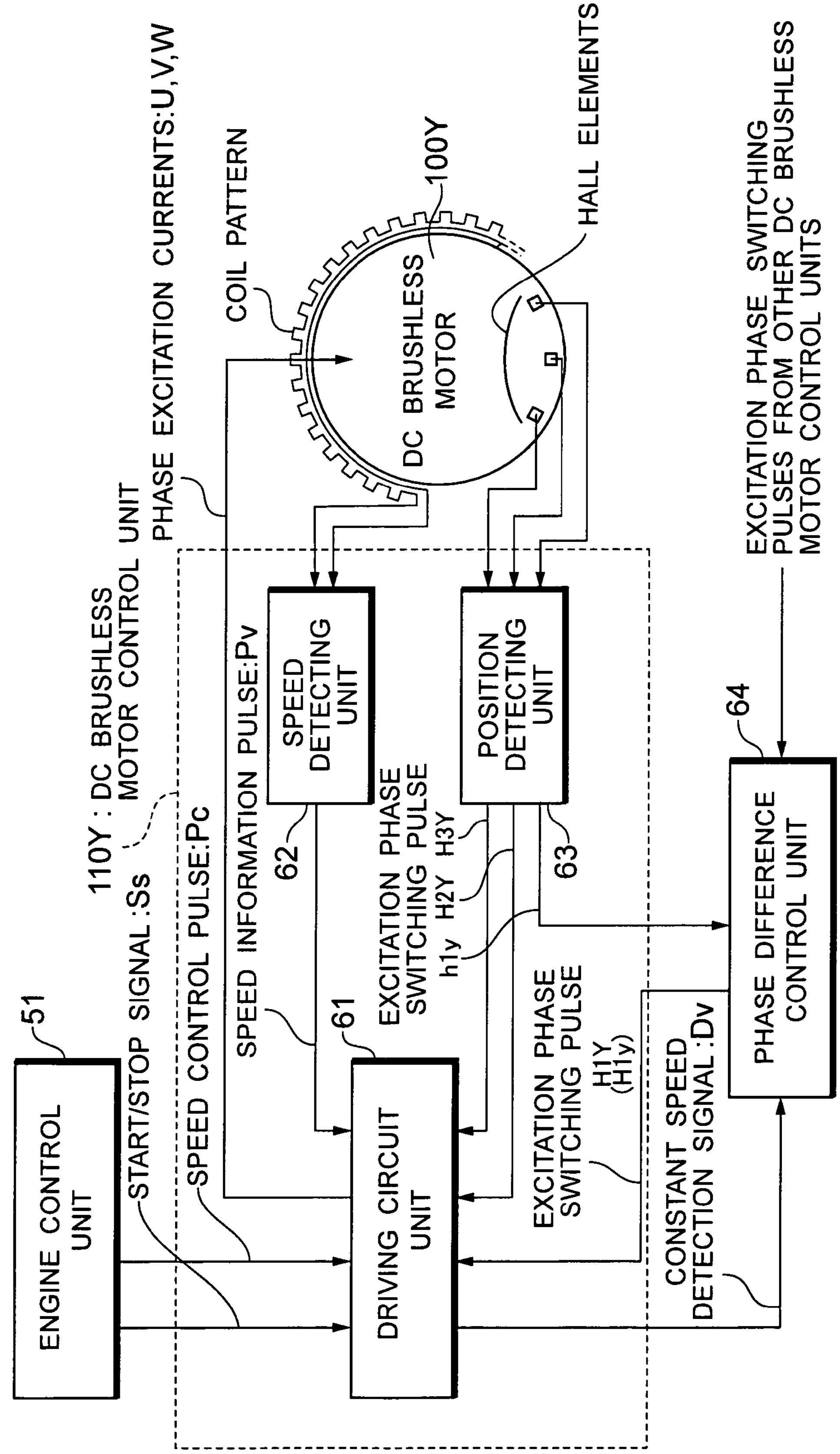
FIG. 3 is a block constructional diagram of a DC brushless motor control unit.

FIG. 3 is a block constructional diagram of a DC brushless motor control unit.

As shown in FIG. 2, the four DC brushless motors 100Y, 101M, 102C, and 103K are connected to the engine control unit 51 through DC brushless motor control units 110Y, 111M, 112C, and 113K. Since those four control units have the same construction, only the DC brushless motor control unit 110Y will be described here as an example.

As shown in the diagram, the DC brushless motor control unit 110Y comprises a driving circuit unit 61, a speed detecting unit 62, a position detecting unit 63, and a phase difference control unit 64.

The driving circuit unit 61 receives: a start/stop signal Ss and a speed control pulse Pc from the engine control unit 51; a speed information pulse Pv from the speed detecting unit 62; excitation phase switching pulses H2Y and H3Y from the position detecting unit 63; and an excitation phase switching pulse H1$y$ from the phase difference control unit 64, respectively. The driving circuit unit 61 supplies phase excitation currents U, V, and W to the DC brushless motor 100Y. Further, the driving circuit unit 61 outputs a constant speed detection signal Dv to the phase difference control unit 64 and controls the DC brushless motor 100Y so as to rotate at a constant rotational speed.

The start/stop-signal Ss is a signal by which the engine control unit 51 instructs the DC brushless motor 100Y to be activated or stopped. The speed control pulse Pc is a signal by which the engine control unit 51 controls the rotational speed of the DC brushless motor 100Y by a repetitive frequency of a pulse train which is outputted from the engine control unit 51.

The constant speed control is made as follows. The driving circuit unit 61 makes the constant speed control by accelerating or decelerating the motor on the basis of the voltage depending on a deviation between the respective frequencies by PLL control of the speed information pulse Pv detected by the speed detecting unit 62 and the speed control pulse Pc which is outputted by the engine control unit 51. When the voltage depending on the frequency deviation is equal to or less than a predetermined voltage, it is determined that the rotational speed has reached the constant speed, and the driving circuit unit 61 generates the constant speed detection signal Dv.

The speed detecting unit 62 detects the rotational speed of the DC brushless motor 100Y and sends the speed information pulse Pv to the driving circuit unit 61. The rotational speed is detected as follows. A number of N magnetic poles and S magnetic poles are alternately arranged along a circumference of a rotor of the motor. A printed circuit board which forms coil patterns along a circumference of a stator of the motor which the magnetic poles face is arranged. When the rotor rotates, interlinkage of the magnetic poles occurs repetitively on a print pattern and an AC electromotive force is generated between terminals of the print pattern. The pulse train according to the rotational speed is obtained by shaping a waveform of the AC electromotive force. This pulse train is the speed information pulse Pv mentioned above.

The position detecting unit 63 detects a position of the rotor (rotational phase angle) of the DC brushless motor 100Y, outputs the excitation phase switching pulses H2Y and H3Y to the driving circuit units 61, and outputs an excitation phase switching pulse h1$y$ to the phase difference control unit 64. The position of the rotor (rotational phase angle) is detected as follows. Three magnetic field intensity sensors such as Hall elements or the like are arranged every rotational phase angle (30°) of the rotor along the circumference of the stator which the magnetic poles of the rotor face (one example). A position information pulse of 3 bits is obtained by waveform-shaping outputs of the three Hall elements. On the basis of a combination of the position information pulses, the excitation phase switching pulses h1$y$, H2Y, and H3Y are formed.

Figure 4:
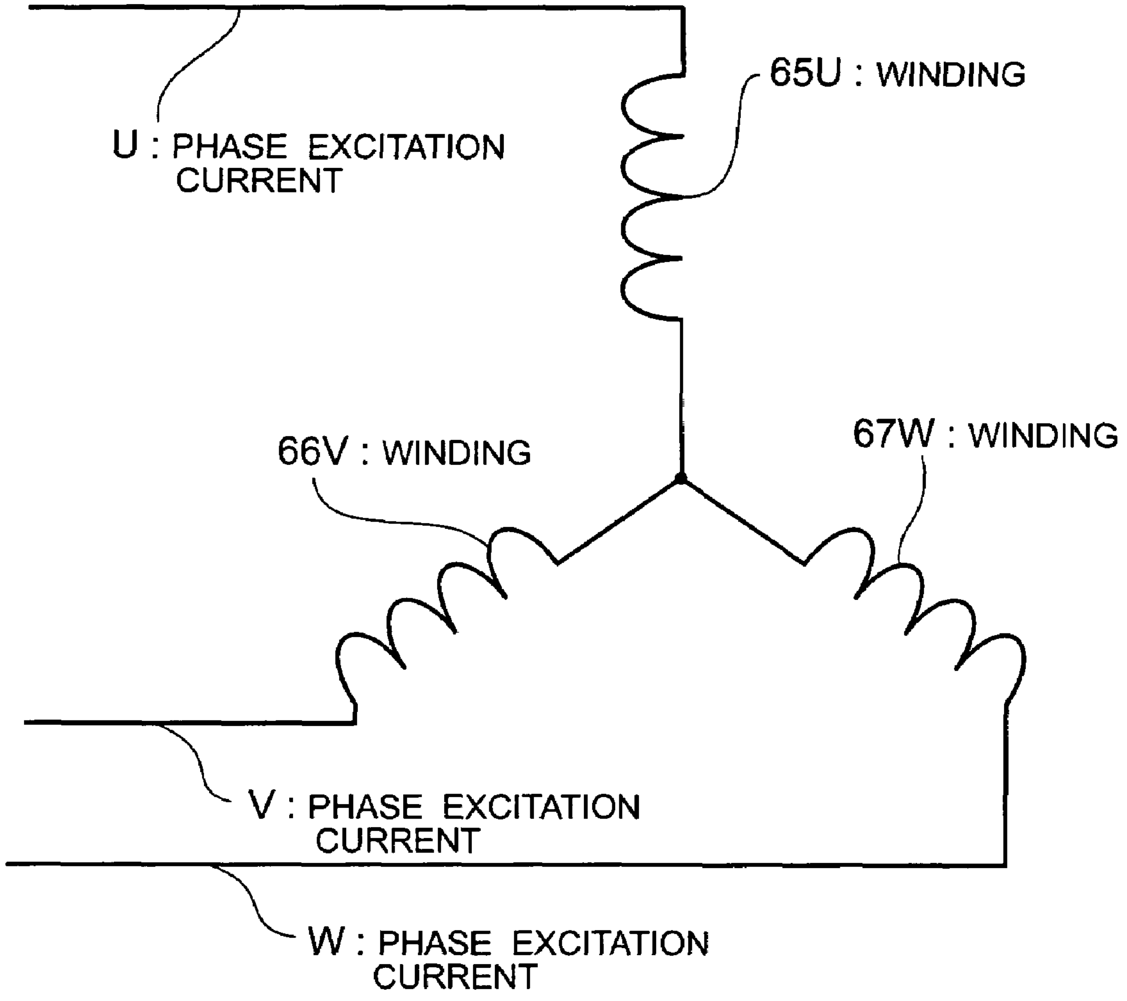
FIG. 4 is a constructional diagram of windings of a DC brushless motor.

FIG. 4 is a constructional diagram of windings of the DC brushless motor.

Current supplying directions (energizing directions) of the phase excitation currents U, V, and W from the driving circuit units 61 (FIG. 3) are determined in the driving circuit units 61 on the basis of logic arithmetic operations of the excitation phase switching pulses H1Y, H2Y, and H3Y. The current supply to one direction of each of windings 65U, 66V, and 67W which are star-connected occurs and the supplied current is fed back to the driving circuit units 61 (FIG. 3).

Figure 5:
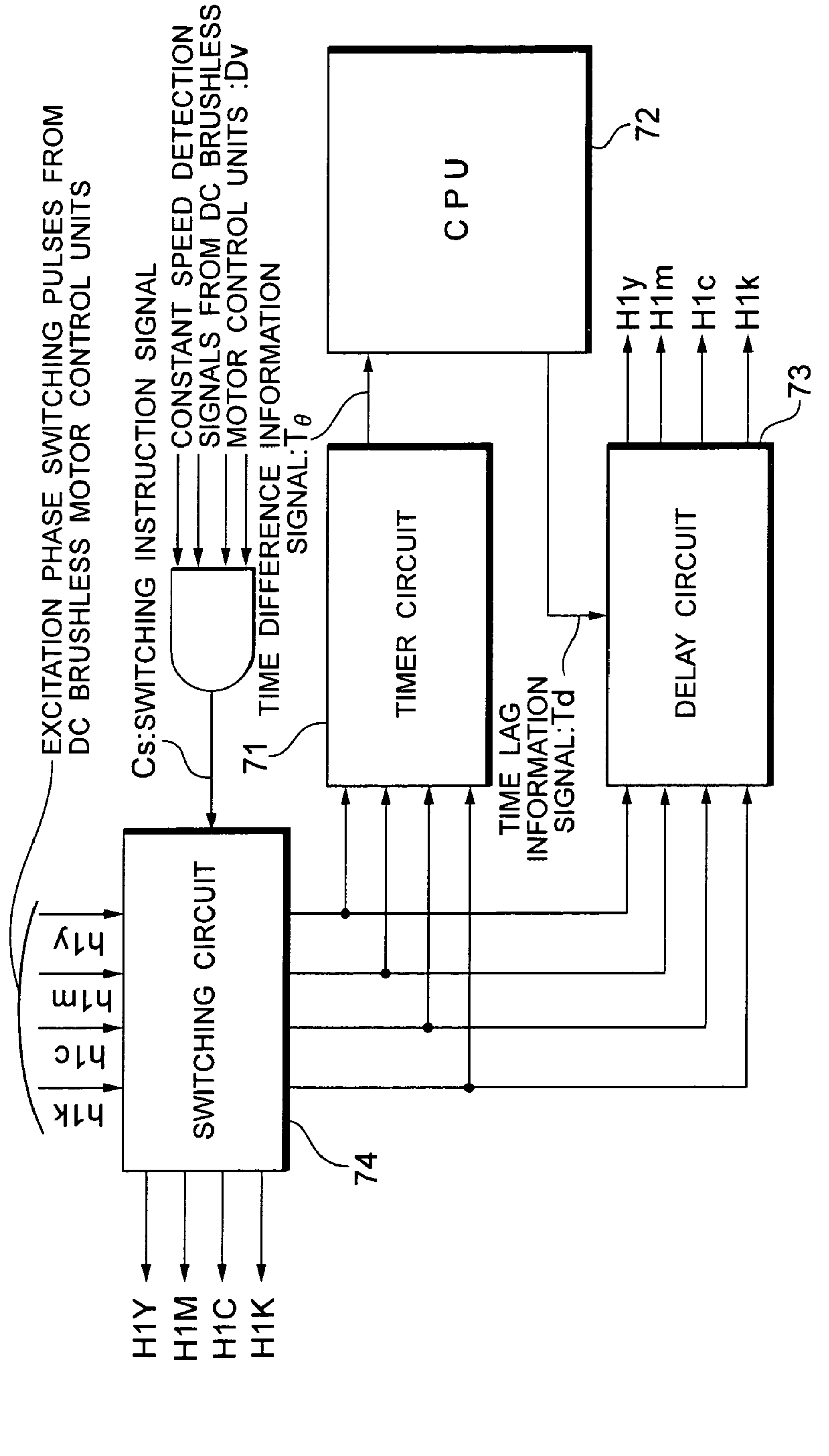
FIG. 5 is a constructional diagram of a phase difference control unit according to the embodiment 1.

FIG. 5 is a constructional diagram of the phase difference control unit according to the embodiment 1.

As shown in the diagram, the following pulses are inputted to a switching circuit 74: the excitation phase switching pulse h1$y$ from the position detecting unit 63 in the DC brushless motor control unit 110Y; an excitation phase switching pulse h1m from the position detecting unit 63 in the DC brushless motor control unit 111M; an excitation phase switching pulse h1$c$ from the position detecting unit 63 in the DC brushless motor control unit 112C; and an excitation phase switching pulse h1$k$ from the position detecting unit 63 in the DC brushless motor control unit 113K, respectively.

The operation of the switching circuit 74 is determined by a logic value of a switching instruction signal Cs obtained by calculating the AND of constant speed detection signals which are inputted from the DC brushless motor control units of the DC brushless motors 100Y, 101M, 102C, and 103K. When the speed of at least one of the motors does not reach the constant speed, the excitation phase switching pulses h1$y$, h1$m$, h1$c$, and h1$k$ inputted to the switching circuit 74 are outputted respectively serving as H1Y, H1M, H1C, and H1K and transmitted to the driving circuit unit 61 (FIG. 3) of the respective motors.

On the other hand, if the speeds of all of the motors have reached the constant speed, the excitation phase switching pulses h1*y*, h1*m*, h1*c*, and h1*k* inputted to the switching circuit 74 are transmitted to a timer circuit 71 and a delay circuit 73, respectively.

The timer circuit 71 calculates a phase difference between a leading edge of the excitation phase switching pulse h1*y* and a leading edge of each of the excitation phase switching pulses h1*m*, h1*c*, and h1*k* and inputs a time difference information signal Tθ to a CPU 72.

The CPU 72 calculates a time lag information signal Td necessary for providing a predetermined phase difference (for example, 15°, 30°, 45°) between the motors in a range from the leading edge of the excitation phase switching pulse h1*y* to the leading edge of each of the excitation phase switching pulses h1*m*, h1*c*, and h1*k* on the basis of the time difference information signal Tθ, the motor rotational speed, and the predetermined phase difference between the motors and outputs the signal Td to the delay circuit 73.

The delay circuit 73 receives the time lag information signal Td and the excitation phase switching pulses h1*y*, h1*m*, h1*c*, and h1*k*, causes a predetermined time lag in each excitation phase switching pulse, and sends the delayed pulses to the driving circuit units 61 (FIG. 3) of the DC brushless motors as excitation phase switching pulses H1*y*, H1*m*, H1*c*, and H1*k*, respectively.

The operation of the embodiment 1 will now be described.

Figure 6:
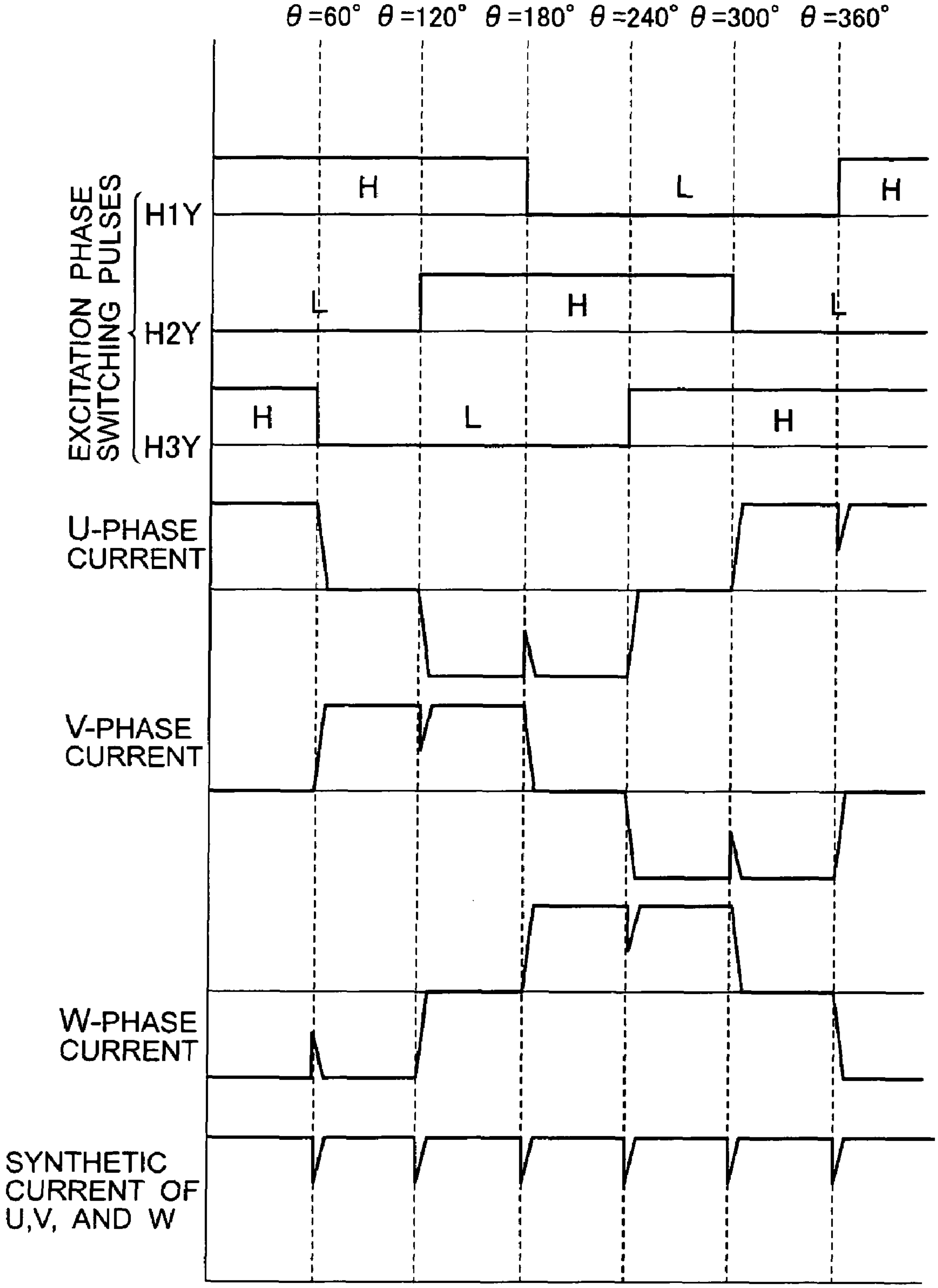
FIG. 6 is a time chart for phase current switching for excitation phase switching pulses.

FIG. 6 is a time chart for the phase current switching for the excitation phase switching pulses.

The diagram shows the state where the excitation phase switching occurs in the U-phase current, V-phase current, and W-phase current of the DC brushless motors by the excitation phase switching pulses H1Y, H2Y, and H3Y, respectively. An axis of abscissa indicates a common electric angle (phase) and an axis of ordinate indicates change states of the high (H) level and the low (L) level of the excitation phase switching pulses H1Y, H2Y, and H3Y and time-dependent changes of the U-phase current, the V-phase current, the W-phase current, and a synthetic current value of a U phase, a V phase, and a W phase in order from an upper position.

As shown in the diagram, the phases of the excitation phase switching pulses H1Y, H2Y, and H3Y are sequentially shifted by 120° at a time and the phase-shifted pulses H1Y, H2Y, and H3Y are sent to the driving circuit units 61 (FIG. 3), so that a (positive current) and a (negative current) whose phases are sequentially shifted by 120° at a time with respect to the U phase, V phase, and W phase are alternately supplied to the DC brushless motor 100Y (FIG. 3). The excitation phase of each phase current is switched every electric angle θ (=60°). By switching the excitation phase, a ripple (spike-shaped current noise) appears in the synthetic current value of the U phase, V phase, and W phase due to an influence of a counter electromotive force of a coil at the excitation phase switching timing.

The ripple of the synthetic current value of the U phase, V phase, and W phase, independently occurs in each of the DC brushless motors 100Y, 101M, 102C, and 103K. Therefore, there is a possibility of occurrence of such a situation that a plurality of ripples (spike-shaped current noises) are multiplexed at the same timing and become a large power noise. To avoid such a situation, according to the embodiment, the phases of the excitation phase switching pulses in the four DC brushless motors are controlled and the generated ripples are shifted by a phase difference of 15° at a time and dispersed.

Figure 7:
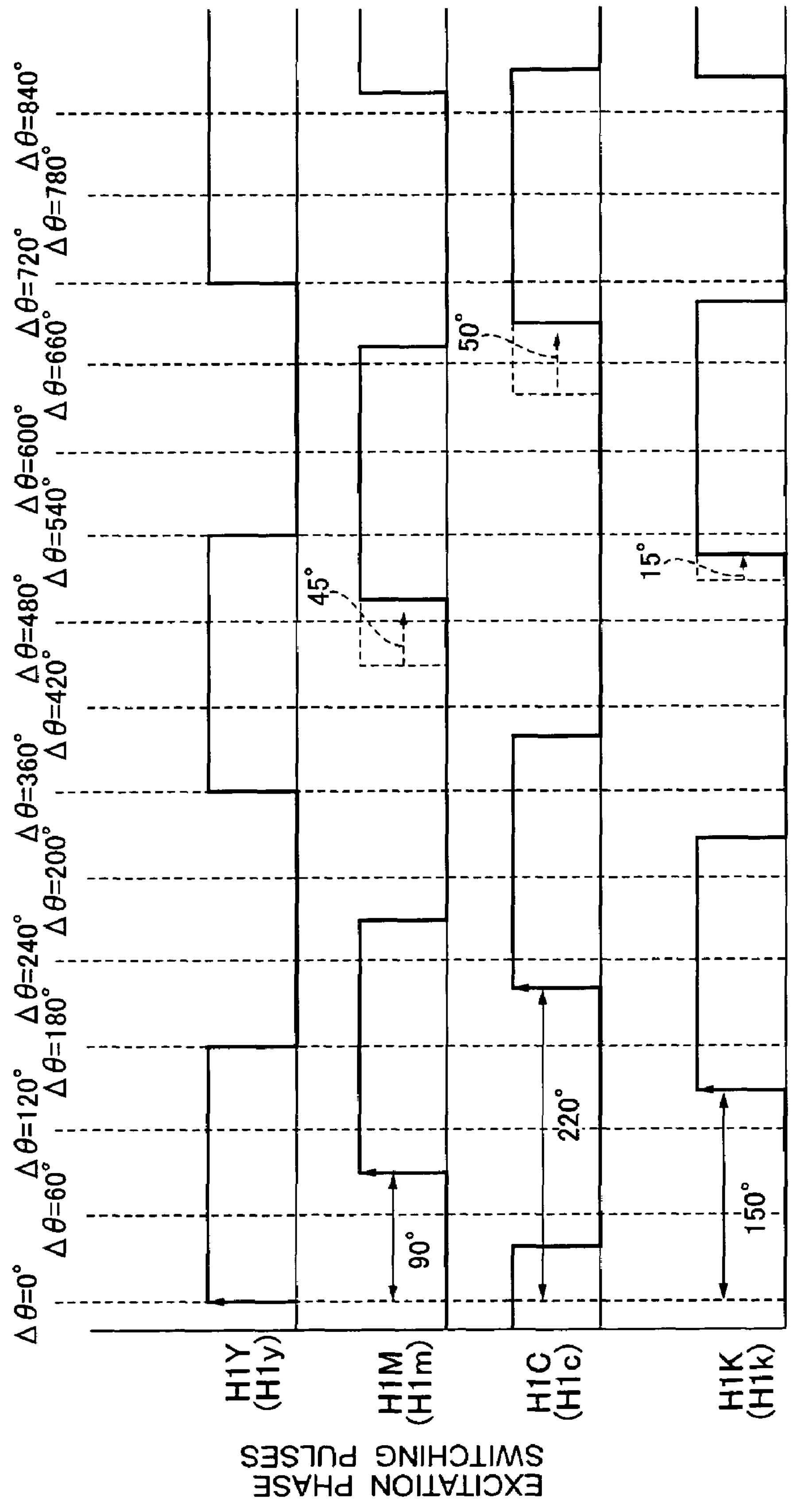
FIG. 7 is a time chart for the excitation phase switching pulses of the phase difference control unit according to the embodiment 1.

FIG. 7 is a time chart for the excitation phase switching pulses of the phase difference control unit according to the embodiment 1.

The diagram shows phase differences (shown by broken lines) of the excitation phase switching pulses h1*y*, h1*m*, h1*c*, and h1*k* before the control and phase differences (shown by solid lines) after they are controlled so as to be shifted by the phase difference of 15° at a time, respectively. An axis of abscissa indicates the common electric angle (phase) and an axis of ordinate indicates the states of the high (H) level and the low (L) level of the excitation phase switching pulses h1*y*, h1*m*, h1*c*, and h1*k* in order from an upper position, respectively.

As prerequisite conditions of explanation, it is assumed that in the state before the phases of the excitation phase switching pulses are controlled, when the excitation phase switching pulse H1Y is used as a reference, the excitation phase switching pulse H1M is delayed by 90°, the excitation phase switching pulse H1C is delayed by 220°, and the excitation phase switching pulse H1K is delayed by 150°, respectively. It is also assumed that the predetermined phase differences (15°, 30°, 45°) in the four systems have already been stored in a ROM (not shown) connected to the CPU 72. The operation for controlling the phase differences of the excitation phase switching pulses of the four systems and setting them to 15° will now be described separately in five steps S1 to S5.

Step S1:

The position detecting unit 63 (FIG. 3) detects the position (rotational phase angle) of the rotor of each DC brushless motor and waveform-shapes the outputs of the three Hall elements, thereby obtaining a position information pulse of 3 bits for every DC brushless motor. On the basis of a combination of the position information pulses, the excitation phase switching pulses H1Y, H1M, H1C, and H1K are formed and transmitted to the switching circuit 74 (FIG. 5).

Step S2:

Each DC brushless motor is equal to the constant speed, the switching instruction signal Cs (FIG. 5) is turned on, and the switching circuit 74 (FIG. 5) transmits the received excitation phase switching pulses h1*y*, h1*m*, h1*c*, and h1*k* to the timer circuit 71 (FIG. 5) and the delay circuit 73 (FIG. 5). The timer circuit 71 (FIG. 5) measures the phase difference between the leading edge of the excitation phase switching pulse h1*y* and the leading edge of each of the excitation phase switching pulses h1*m*, h1*c*, and h1*k* and supplies the time difference information signal Tθ to the CPU 72. This state is shown by broken lines in FIG. 7. In this state, when the excitation phase switching pulse h1*y* is used as a reference, the excitation phase switching pulse h1*m* is delayed by 90°, the excitation phase switching pulse h1*c* is delayed by 220°, and the excitation phase switching pulse h1*k* is delayed by 150°, respectively (prerequisite conditions).

Step S3:

The CPU 72 (FIG. 5) sets the phase differences of the excitation phase switching pulses h1*m*, h1*c*, and h1*k* in which the excitation phase switching pulse h1*y* is used as a reference to the predetermined phase differences (15°, 30°, 45°, 60°) by using the following expressions.

When $\theta1>\theta2-60\times n$ $$\theta3=\theta1-(\theta2-60\times n) \quad (1)$$

When $\theta1<\theta2-60\times n$ $$\theta3=\theta1+60-(\theta2-60\times n) \quad (2)$$

where,

θ1: Predetermined phase differences (15°, 30°, 45°)

θ2: Phase differences from the reference phase; (90°, 220°, 150°) according to the prerequisite conditions

θ3: Necessary delay generation amount n: Integer in which (θ2−60×n) becomes maximum The necessary delay generation amount and the delay time of each the excitation phase switching pulses in FIG. 7 are obtained as follows by using the above calculating expressions.

The excitation phase switching pulse H1*m:*

When the expression (2) is applied, the necessary delay generation amount θ3=45° because θ1=15°, θ2=90°, and n=1.

The excitation phase switching pulse H1*c:*

When the expression (2) is applied, the necessary delay generation amount θ3=50° because θ1=30°, θ2=220°, and n =3.

The excitation phase switching pulse H1*k:*

When the expression (2) is applied, the necessary delay generation amount θ3=15° because θ1=45°, θ2=150°, and n=2.

The states where the phases of the excitation phase switching pulses have been changed on the basis of the value θ3 obtained as mentioned above are shown by the solid line in the diagram.

Step S4:

The CPU 72 (FIG. 5) converts the value θ3 obtained in step S3 into delay time by the following expression (3).

(60/rotational speed rpm)/[(the number of coils/the number of phases)× electric angle 360°] (3)

Step S5:

The delay circuit 73 (FIG. 5) delays the excitation phase switching pulses on the basis of the time lag information signal Td obtained by the CPU 72 (FIG. 5) on the basis of the expression (3) and supplies the delayed pulses as excitation phase switching pulses H1*y*, H1*m*, H1*c*, and H1*k* to the driving circuit units 61 of the DC brushless motor control units 110Y, 111M, 112C, and 113K, respectively. Thus, the phase excitation currents whose phases are delayed by 15° at a time are outputted every color from the driving circuit units 61, respectively.

As described above, the apparatus has: the position detecting unit 63 (FIG. 3) for detecting the rotational position information of each of a plurality of motors; and the phase difference control unit 64 (FIG. 3) for outputting the excitation phase switching signals of the plurality of motors on the basis of the rotational position information of each motor and the time difference information which has previously been stored. By adjusting the phase differences of the drive currents which are supplied to the plurality of motors, the ripple (spike-shaped current noise) which is generated in each motor is dispersed. The generation of the large power noise is prevented. There are obtained such an effect that it is possible to prevent the occurrence of the unexpected problem in which it induces the erroneous operation of the CPU in the apparatus, it becomes the electromagnetic noise and is dispersed to the peripheral equipment, or the like.

Although the phase currents whose phases are delayed by 15° at a time are supplied every color in the above explanation, the invention is not limited to such an example. That is, a predetermined effect can be obtained if the ripples (spike-shaped current noises) which are generated in the drive currents are not added at the same timing. Although the excitation phase switching pulse H1*y* is used as a reference and the phase differences are increased in order of the excitation phase switching pulses H1*m*, H1*c*, and H1*k* in the above explanation, the invention is not limited to such an example. That is, an arbitrary parameter may be used as a reference excitation phase and the order of the excitation phase switching pulses is not fixed.

Embodiment 2

In the embodiment 1, the time lag information signal Td for generating the necessary delay generation amount θ3 calculated by the CPU 72 (FIG. 5) is directly transmitted to the delay circuit 73. According to such a construction, for a time interval until the DC brushless motor reaches the constant speed just after the generation of the necessary delay generation amount θ3, a time during which the motor is largely decelerated occurs. In the embodiment, to solve such an inconvenience, the necessary delay generation amount θ3 is divisionally generated a plurality of number of times.

Figure 8:
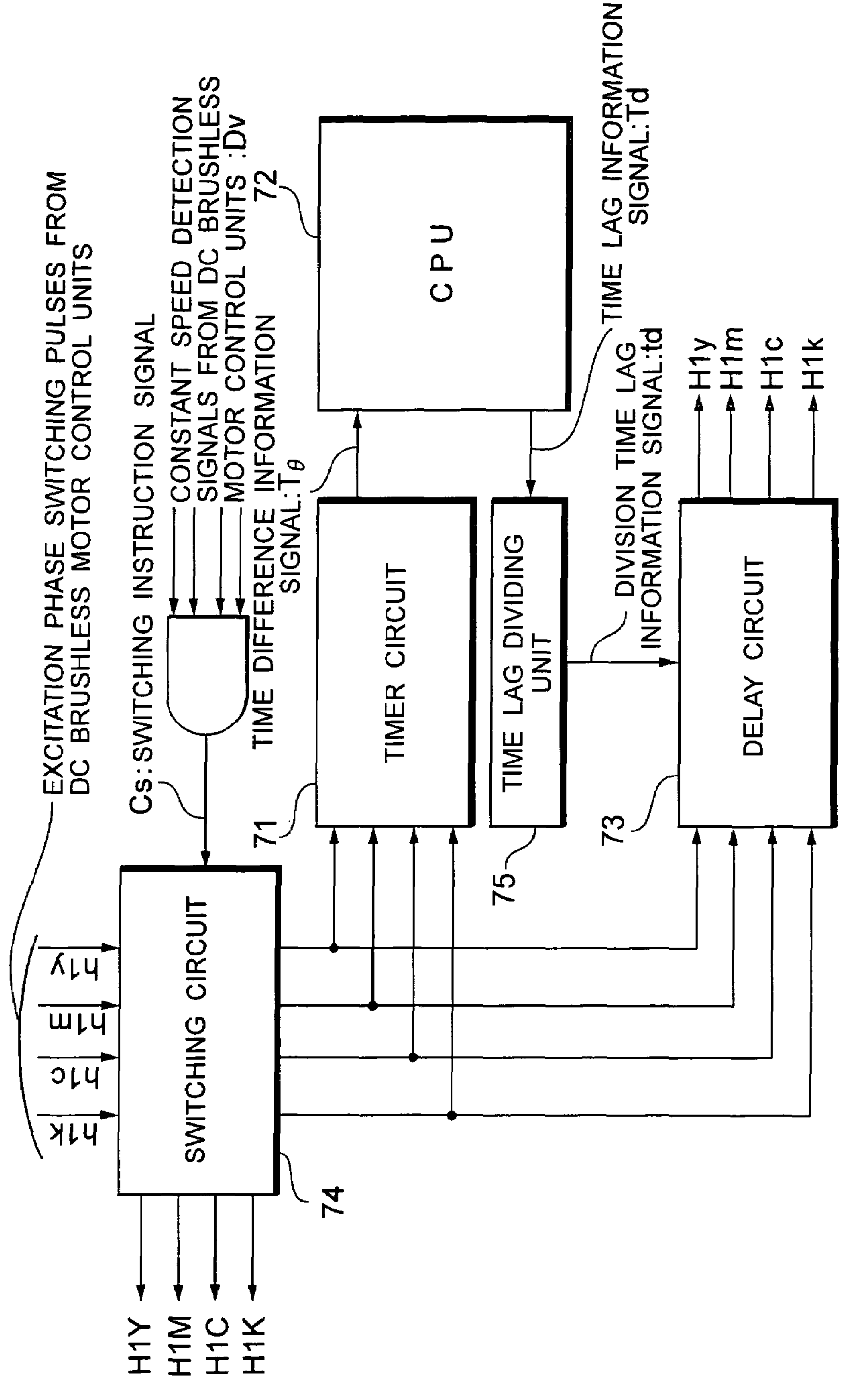
FIG. 8 is a constructional diagram of a phase difference control unit according to the embodiment 2.

FIG. 8 is a constructional diagram of a phase difference control unit according to the embodiment 2.

As shown in the diagram, in the embodiment 2, a time delay dividing unit 75 is added between the CPU 72 and the delay circuit 73 in the embodiment 1.

The time delay dividing unit 75 receives the time lag information signal Td for generating the necessary delay generation amount θ3 from the CPU 72 and divisionally outputs the delay time to the delay circuit a plurality of number of times as a plurality of division time lag information signal td. Since the whole construction other than the portion of the time delay dividing unit 75 is substantially the same as that in the embodiment 1, its explanation is omitted.

Figure 9:
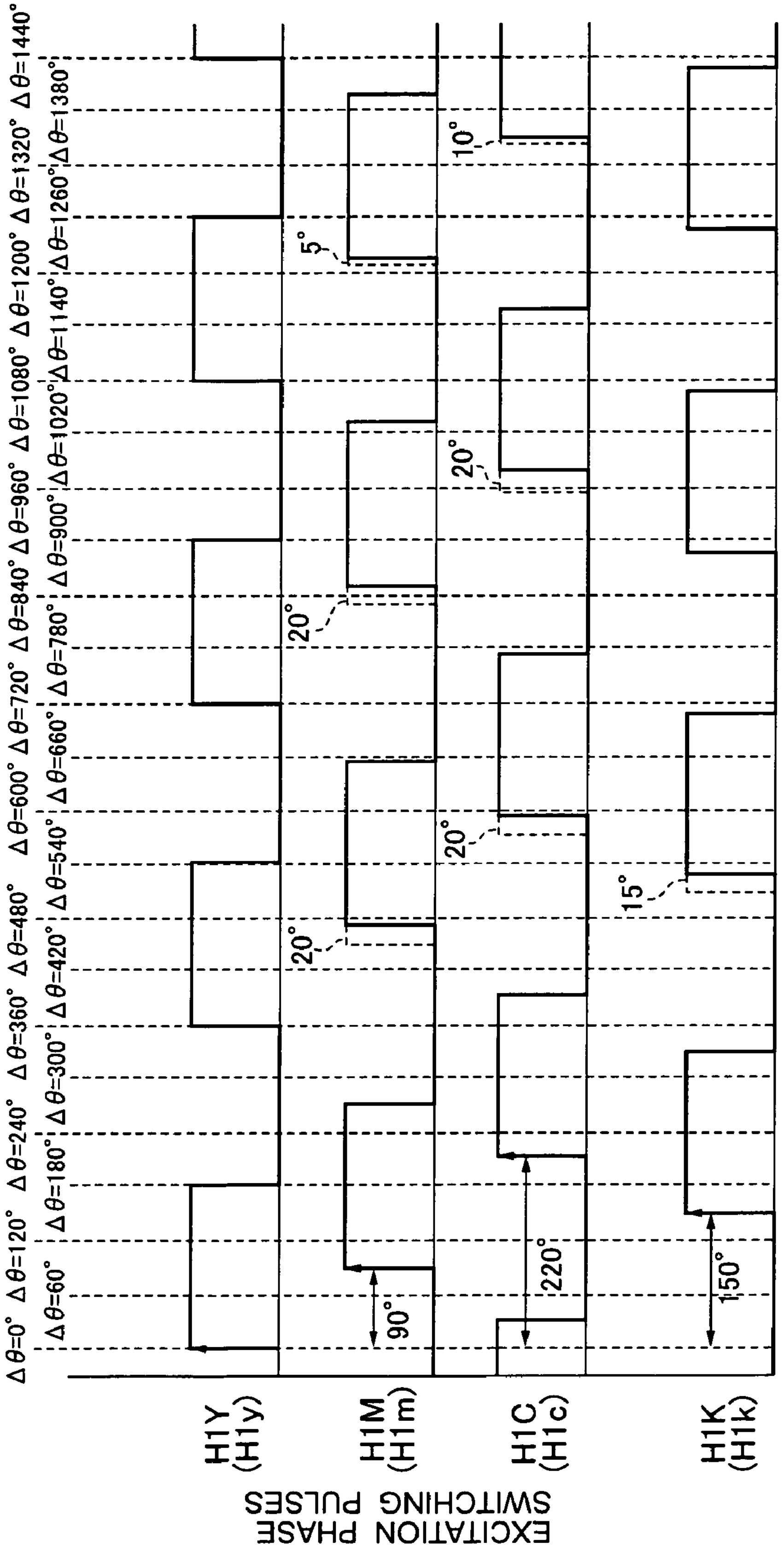
FIG. 9 is a time chart for excitation phase switching pulses of the phase difference control unit according to the embodiment 2.

FIG. 9 is a time chart for excitation phase switching pulses of the phase difference control unit according to the embodiment 2.

The diagram shows phase differences (shown by solid lines) in the case where the excitation phase switching pulse H1Y is used as a reference, the phase differences (90°, 220°, 150°) between the excitation phase switching pulse H1Y and the excitation phase switching pulses H1M, H1C, and H1K before the control are divisionally controlled a plurality of number of times, and the excitation phase switching pulses H1M, H1C, and H1K are sequentially shifted by the phase difference of 15° at a time, respectively. An axis of abscissa indicates the common electric angle (phase) and an axis of ordinate indicates the states of the high (H) level and the low (L) level of the excitation phase switching pulses H1Y, H1M, H1C, and H1K in order from an upper position, respectively.

As prerequisite conditions of explanation, it is assumed that in the state before the phases of the excitation phase switching pulses are controlled, when the excitation phase switching pulse H1Y is used as a reference, the excitation phase switching pulse H1M is delayed by 90°, the excitation phase switching pulse H1C is delayed by 220°, and the excitation phase switching pulse H1K is delayed by 150°, respectively. It is also assumed that the predetermined phase differences (15°, 30°, 45°) in the four systems have already been stored in a ROM (not shown) connected to the CPU 72. The operation for controlling the phase differences of the excitation phase switching pulses of the four systems and setting them to 15° will now be described separately in six steps S11 to S16.

Step S11:

The position detecting unit 63 (FIG. 3) detects the position (rotational phase angle) of the rotor of each DC brushless motor and waveform-shapes the outputs of the three Hall elements, thereby obtaining a position information pulse of 3 bits for every DC brushless motor. On the basis of a combination of the position information pulses, the excitation phase switching pulses H1Y, H1M, H1C, and H1K are formed and transmitted to the switching circuit 74 (FIG. 8).

Step S12:

Each DC brushless motor is equal to the constant speed, the switching instruction signal Cs (FIG. 8) is turned on, and the switching circuit 74 (FIG. 8) transmits the received excitation phase switching pulses h1*y*, h1*m*, h1*c*, and h1*k* to the timer circuit 71 (FIG. 8) and the delay circuit 73 (FIG. 8). The timer circuit 71 (FIG. 8) measures the phase difference between the leading edge of the excitation phase switching pulse h1*y* and the leading edge of each of the excitation phase switching pulses h1*m*, h1*c*, and h1*k* and supplies the time difference information signal Tθ to the CPU 72. At this point of time, when the excitation phase switching pulse h1*y* is used as a reference, the excitation phase switching pulse h1*m* is delayed by 90°, the excitation phase switching pulse h1*c* is delayed by 220°, and the excitation phase switching pulse h1*k* is delayed by 150°, respectively (prerequisite conditions).

Step S13:

In a manner similar to the embodiment 1, the CPU 72 (FIG. 8) sets the necessary delay generation amount θ3 as follows.

The excitation phase switching pulse H1*m:*

The necessary delay generation amount θ3=45°

The excitation phase switching pulse H1*c:*

The necessary delay generation amount θ3=50°

The excitation phase switching pulse H1*k:*

The necessary delay generation amount θ3=15°

Step S14:

The CPU 72 (FIG. 8) converts the value θ3 obtained in step S3 into delay time by the following expression (3).

(60/rotational speed rpm)/[(the number of coils/the number of phases)× electric angle 360°] (3)

Step S15:

The time delay dividing unit 75 (FIG. 8) forms the division time lag information signal td for divisionally delaying each excitation phase switching pulse a plurality of number of times on the basis of the time lag information signal Td obtained by the expression (3) from the CPU (FIG. 8) and transmits the signal td to the delay circuit 73. As an example, it is now assumed that the maximum value of the phase differences which are delayed by the division time lag information signal td of the first time is set to 20°. Therefore, in the excitation phase switching pulse H1*m*, as shown by a change from the broken line to the solid line in FIG. 9, the pulse is delayed by 20° by the division time lag information signal td of the first time. Likewise, it is delayed by 20° by the division time lag information signal td of the second time and delayed by 5° by the division time lag information signal td of the third time. In the excitation phase switching pulse H1*c,* the pulse is delayed by 20° by the division time lag information signal td of the first time, delayed by 20° by the division time lag information signal td of the second time, and delayed by 10° by the division time lag information signal td of the third time. Further, in the excitation phase switching pulse H1*k*, the pulse is delayed by 15° by the division time lag information signal td of the first time.

Step S16:

The delay circuit 73 (FIG. 8) receives the division time lag information signal td from the time delay dividing unit 75 (FIG. 8), delays the excitation phase switching pulses, and supplies them as excitation phase switching pulses H1*y*, H1*m*, H1*c*, and H1*k* to the driving circuit units 61 of the DC brushless motor control units 110Y, 111M, 112C, and 113K, respectively. Thus, after the delay setting made by the division time lag information signal td divided into a plurality of number of times, the phase excitation currents whose phases are delayed by 15° at a time are outputted every color from the driving circuit units 61, respectively.

As described above, by making the delay setting on the basis of the division time lag information signal td divided into a plurality of number of times, the situation where the motor is largely decelerated for a time interval until the DC brushless motor reaches the constant speed does not occur and, while maintaining the stability of the operation, the effect of the embodiment 1 can be also obtained.

Although the invention has been described above on the assumption that the phase excitation currents whose phases are delayed by 15° at a time are supplied every color, the invention is not limited to such an example. That is, the predetermined effect can be obtained if the ripples (spike-shaped current noises) which are generated in the drive currents are not added at the same timing. Although the excitation phase switching pulse H1*y* is used as a reference and the phase differences are increased in order of the excitation phase switching pulses H1*m*, H1*c*, and H1*k* in the above explanation, the invention is not limited to such an example. That is, an arbitrary phase may be used as a reference excitation phase and the order of the excitation phase switching pulses whose phase differences are to be increased is not fixed.

Although the invention has been described on the assumption that it is applied to the color electrophotographic printer of the LED system, the invention can be also applied to a color electrophotographic printer of a laser beam system and image forming apparatuses such as a copying apparatus and the like.

The present invention is not limited to the foregoing embodiments but many modifications and variations are possible within the spirit and scope of the appended claims of the invention.

What is claimed is:

1. An image forming apparatus having a plurality of motors which are rotated in response to phase switching signals, comprising:

a position detecting unit which detects a rotational position of each of said plurality of motors;

a time lag information calculating unit which calculates time lag information for changing a phase switching time between said motors; and a phase difference control unit configured to delay the phase switching signal of at least one of said plurality of motors based on said time lag information when power noise due to phase switching signals generated from the rotational position information of each of the motors is multiplexed with the time lag information of each of the motors, so as to shift the corresponding power noise and output a delayed corresponding phase switching signal.

2. The image forming apparatus according to claim 1, wherein said phase difference control unit generates a signal to discriminate whether or not each of said plurality of motors is rotating at a predetermined speed, and said apparatus further comprises a switching circuit which delays said phase switching signal and outputs the delayed signal if it is determined that each of said motors is rotating at said predetermined speed and which outputs said phase switching signal without delaying said signal if it is determined that each of said motors is not rotating at the predetermined speed.

3. The image forming apparatus according to claim 1, wherein said apparatus has a first motor and a second motor as said plurality of motors, and said phase difference control unit has:

a time difference information output unit which receives a first phase switching signal obtained from position detection information of said first motor and a second phase switching signal obtained from position detection information of said second motor and outputs a time difference information signal by using said first phase switching signal and said second phase switching signal; and a time lag information output unit which outputs said time lag information from said time difference information signal and a preliminarily-stored phase difference to be provided between the motors.

4. The image forming apparatus according to claim 3, wherein said apparatus has a third motor and a fourth motor as said plurality of motors, and said preliminarily-stored phase difference to be provided between the motors is equal to one of 15°, 30°, and 45°.

5. The image forming apparatus according to claim 1, wherein said apparatus has a first motor and a second motor as said plurality of motors, and said phase difference control unit has:

a time difference information output unit which receives a first phase switching signal obtained from position detection information of said first motor and a second phase switching signal obtained from position detection information of said second motor and outputs a time difference information signal by using said first phase switching signal and said second phase switching signal;

a first time lag information output unit which outputs first time lag information from said time difference information signal and a preliminarily-stored phase difference to be provided between the motors; and a time lag dividing unit which divides said first time lag information and outputs a time lag signal.

6. The image forming apparatus according to claim 5, wherein said apparatus has a third motor and a fourth motor as said plurality of motors, and said preliminarily-stored phase difference to be provided between the motors is equal to one of 15°, 30°, and 45°.

7. An image forming apparatus having a first motor and a second motor which are rotated in response to phase switching signals, comprising:

a position detecting unit which detects a rotational position of each of said plurality of motors;

a time lag information calculating unit which calculates time lag information for changing a phase switching time between said motors; and a phase difference control unit comprising:

a time difference information output unit which receives a first phase switching signal obtained from position detection information of said first motor and a second phase switching signal obtained from position detection information of said second motor and outputs a time difference information signal by using said first phase switching signal and said second phase switching signal:

a first time lag information output unit which outputs first time lag information from said time difference information signal and a preliminarily-stored phase difference to be provided between the motors: and a time lag dividing unit which divides said first time lag information and outputs a time lag signal wherein said time lag dividing unit outputs said time lag signal from a preset maximum delay phase difference and said first time lag information, and wherein the phase difference control unit which, when power noise due to phase switching signals generated from the rotational position information of each of the motors is multiplexed with the time lag information of each of the motors, is configured to delay the phase switching signal of at least one of said plurality of motors based on said time lag information so to shift the corresponding power noise and outputs a delayed phase switching signal.

8. The image forming apparatus according to claim 1, further comprising a medium conveying path which conveys a medium, and wherein a rotor is coupled with each of said plurality of motors and said plurality of rotors are arranged along said medium conveying path.

9. The image forming apparatus according to claim 8, further comprising print mechanisms which print a plurality of different colors, and wherein said rotors are mounted in said different print mechanisms.

10. The image forming apparatus according to claim 1, wherein said plurality of motors are DC brushless motors.

* * * * *